United States Patent Office 3,558,419
Patented Jan. 26, 1971

3,558,419
COMPOSITE FILAMENTS AND FIBERS
Kaoru Okazaki, Asaharu Nakagawa, and Kenji Sugii, Nagoya, Japan, assignors to Toyo Rayon Kabushiki Kaisha, Tokyo, Japan, a corporation of Japan
No Drawing. Filed May 27, 1968, Ser. No. 732,105
Int. Cl. D02g 1/18, 3/36
U.S. Cl. 161—173                                          24 Claims

ABSTRACT OF THE DISCLOSURE

Composite fibers in which at least two polymeric components are arranged in intimate mutual contact along the fiber length, and at least one of the said components is a fiber-forming polyester, and the other of the said components is a polyether-polyamide-block-copolymer composed of linear polyamide segments and polyalkylene ether segments, the polyalkylene ether segment content of the copolymer being 3 to 85% by weight, and the polyalkylene ether segment content of the composite fibers being 0.3 to 30% by weight.

---

This invention relates to composite filaments and fibers. More particularly, the invention relates to composite filaments and fibers of excellent antistatic property, hygroscopicity, dyeability and which furthermore possess improved hand.

Snythetic polyester filaments and fibers exhibit numbers of desirable advantages such as excellent mechanical properties and durability. Accordingly they are used with wide application areas including the field of textile fabrics. However, the commercially available polyester fibers are less satisfactory compared with natural wool, in such respects as stretchability, compression resistance, liveliness, hygroscopicity, dyeability, antistatic property and surface feeling. Many attempts have been made, accordingly, to impart one or more of the desirable properties of wool to polyester fibers, without appreciably impairing the inherent advantageous properties of the latter. However, none ever succeeded to simultaneously improve the hygroscopicity, antistatic property, stretchability and feeling of polyester fibers to the levels close to those qualities of wool. Method of achieving such, therefore, is one of the greatest pending problems of the concerned trade.

Some of the heretofore proposed attempts to improve the polyester fiber properties to bring about better qualitative resemblance to wool included the preparation of composite filaments or fibers of which at least one of the components is polyester. In majority of the attempts, same type of polymers, i.e., resembling polyesters of different shrinkages, are composed or combined for the reason of better adhesion between or among the components. Thus obtained composite fibers may be satisfactory as to crimping property, but the improvements in their hygroscopicity, antistatic property and dyeability are comparatively negligible. That is, for a composite fiber to exhibit good hygroscopicity, antistatic property and dyeability, at least one of its components must possess such characteristics. Normally, therefore, such characteristics are imparted by bonding one or more hydrophilic monomers with polyester component, by means of copolymerizaton. However, in order to achieve the improvement of the desired level, a considerably large amount of hydrophilic monomer component must be compounded with polyester component. Whereas, polyesters bonded with such large amounts of hydrophilic monomer no more retain their orginal, excellent mechanical properties and durability. Also there was another attempt in which a minor amount of hydrophilic compound, for example, polyethylene glycol, is mixed with a component of composite fibers in order to improve the antistatic property and hygroscopicity of the product. The result was that, although the desirable mechanical properties inherent in polyester fibers were retained, so imparted characteristics are not lasting.

On the other hand, composite fibers made from different types of polymers, for instance, polyester and polyamide, have been proposed. Because polyamide has a better dyeability and hygroscopicity than polyester, such composite fibers possess improved dyeability and hygroscopicity over polyester fibers, and concurrently exhibit the desirable properties of both polyester and polyamide fibers. Polyester and polyamide, however are poorly compatible, or have poor adhesibility to each other. Therefore the product has a fatal deficiency in that the two components tend to be separated during processing or usage. Accordingly, normally core-in-sheath type structure is employed for this type of composite fibers, and side-by-side type structure is unsuitable.

Whereas, the following facts have now been found, i.e.:

(1) Polyalkylene ether - polyamide - block-copolymer which contains linear polyamide segments and polyalkylene ether segments has better compatibility with polyester than homopolyamide. Inter alia, polyalkylene ether-polyamide-block-copolymer containing 3 to 85% by weight, preferably 8 to 60% by weight, of polyalkylene ether segments; and mixtures of polyalkylene ether-polyamide-block-copolymer with polyamide which contain 3 to 85 weight percent, preferably 8 to 60 weight percent, of polyalkylene ether segments exhibit far better adhesibility with polyester than homopolyamide.

(2) The composite fibers obtained by composing the above block-copolymer or the mixture thereof with polyamide with a fiber-forming polyester at such a ratio that the said polyalkylene ether segments should occupy 0.3 to 30% by weight of the composite fibers, retain the desirable properties inherent in polyester fibers and concurrently possess excellent antistatic property as well as good hygroscopicity and dyeability.

(3) Furthermore, the composite fibers composed of a polyester of high modulus and the block-copolymer which is elastic and has a low modulus possess an excellent feeling, such as never expected from the fibers of any single component.

(4) Most of the composite fibers described are crimpable.

Thus, the present invention provides composite filaments or fibers in which at least two polymeric components are arranged in intimate adherence to each other along the length of the filament or fiber and one of the component is a fiber-forming polyester, characterized in that the another essential component is a polyalkylene ether-polyamide-block-copolymer or a mixture of the block-copolymer with a fiber-forming polyamide, said copolymer comprising synthetic linear polyamide segments and 3 to 85% by weight of polyalkylene ether segments, and that the amount of the polyalkylene ether segments based on the composite filaments or fibers is 0.3 to 30% by weight.

The polyalkylene ether-polyamide-block-copolymer employed in the invention must contain 3 to 85 percent by weight of polyalkylene ether segments. Such copolymers containing less than 3 weight percent, or more than 85 weight percent, of the ether segments exhibit poor compatibility or adhesibility to polyester, and cause handling problems during processing. Furthermore, the block-copolymers containing more than 85 weight percent of polyalkylene ether segments are remarkably inferior in heat stability and chemical resistance.

In most cases, the copolymers containing 8 to 60 weight percent of the ether segments are preferred. In case the ether segment content of the copolymer exceeds 60 weight percent, it is advantageous to mix the copolymer with a fiber-forming polyamide, and compose that mixture with a polyester component, rather than composing the copolymer directly with the polyester component.

The polyalkylene ether-polyamide-block-copolymer can be prepared, for example, by such methods as follows:

(A) Polycondensation of at least one polyamide, precursor, e.g., a lactam, ω-amino acid or nylon salt, in the presence of an amino group-terminated polyether or an organic salt thereof.

(B) Polycondensation of at least one polyamide precursor in the presence of a carboxyl group-terminated polyether or an amine salt thereof.

(C) Coupling of a polyether of which two end groups are amino, or carboxyl, or an amino and a carboxyl group, with at least one polyamide oligomer ending with carboxyl groups (when at least one of the polyether end groups is amino) or at least one polyamide oligomer ending with amino groups (when at least one of the polyether end groups is carboxyl), or at least one polyamide oligomer ending with carboxyl and amino groups, in solution or melt form.

As the starting polyether for the preparation of the block-copolymer, polyalkylene oxides, for example, homopolymers and copolymers of alkylene oxides such as ethylene, propylene, butylene, and tetramethylene oxides can be advantageously used. By cyanoethylation and following hydrogenation of such an alkylene oxide, polyether having two amino end groups is obtained. Also hydrolysis of cyanoethylated alkylene oxide yields, polyether having carboxyl end groups. The preferred degree of polymerization of the starting polyalkylene oxide ranges 20 to 180, particularly, 25 to 140. If that value is less than 20, the resultant block-copolymer exhibit poor thermal characteristics. Also if the polymerization degree of polyalkylene oxide is excessively high, the block-copolymer tends to have a lowered adhesibility to polyester. Particularly, it is found that the ether segments in the block-copolymer should be advantageously composed of polyalkylene oxide of a polymerization degree of up to 140, for the preparation of composite fibers of side-by-side structure.

As the polyamide precursor suitable for the preparation of the block-copolymer, the following are the preferred examples: lactams of 6 to 12 carbons, particularly ε-caprolactam; ω-aminocarboxylic acids such as 6-aminocaproic, 9-amino-nonanoic, 10-aminocapric, and 11-amino-undecanoic acids, used either singly or as mixture of no less than two components; and nylon salts of hexamethylenediamine or methaxylylenediamine with adipic, sebacic, suberic, and/or isophthalic acid.

The polyester which is used as an essential component of the composite fibers of this invention include fiber-forming homo- and co-polyesters composed of a dibasic acid component and a dioxy component, or of oxycarboxylic acid, and modified polyesters containing up to 30 weight percent of other copolymerizable component. For example, polyethylene terephthalate, polyethylene isophthalate, polyethylene terephthalate isophthalate, poly-p-ethylene oxybenzoate, polycarbonate, polyethylene adipate, polyethylene terephthalate adipate, and modified polyesters derived from the foregoing may be named. Particularly the modified polyester containing up to 30 weight percent of polyamide blocks is advantageously used as the polyester component of the composite fibers of this invention, because it possesses a better adhesibility to the polyalkylene ether-polyamide-block-copolymer than unmodified polyesters.

The polyester component and polyalkylene ether-polyamide-block-copolymer component composing the composite fibers of this invention may contain conventional additives, such as viscosity stabilizer, antioxidant, stabilizing agents against heat and light, delusterant and other pigments, etc. Also each of the compenents may contain starting material (for example, block polyetheramide may contain polyamide and polyether, or block polyesteramide may contain polyamide and polyester). It is again permissible for either of the components to contain polymeric materials other than the starting materials of the component. For instance, the polyalkylene ether-polyamide-block-copolymer may contain polyamide. In fact, the block-copolymer compenent containing more than 60 weight percent of polyalkylene ether segments is first mixed with polyamide to be reduced of its polyalkylene ether segment content to 3 to 85%, preferably 8–60%, based on the total weight of the mixture, with greater advantage. In that case also the desirable polyalkylene ether segment content of the composite fiber is 0.3–30 weight percent.

The two or more components of the composite fiber may be present in side-by-side, of core- (or cores-) in-sheath relationship. The core-in-sheath relationship may be arranged concentrically or eccentrically. If the core-in-sheath structure is employed, even the composite fibers containing a relatively minor amount (e.g., 0.3–10 weight percent) of polyalkylene ether segments present no operational problem during the processing. Whereas, side-by-side type composite fibers should preferably contain a larger amount (e.g., more than 10 weight percent) of the ether segments.

The composite fibers of the invention can be prepared by the means which are known per se.

In two-component composite fibers, the composing ratio employed is 90–30 weight percent of the polyester component to the balance amount of the other. Particularly 80–50 weight percent of the polyester component is the range conveniently employed in practice. Also when more than two components are employed, it is suitable to cause the presence of at least 10 weight percent of each component.

Hereinafter numbers of illustrative examples are given for easier understanding of the invention.

The terms used in the following examples have the definitions below.

(1) Relative viscosity was measured at 25° C. as to the solution of 1 g. of the sample in 100 ml. of the indicated solvent.

(2) Frictional static charge.—Sample (A) (knit piece of filaments) as set on the rotor of a rotary static tester (improved product of Kowa Shokai, Japan), and with the rotation at a fixed speed (800 r.p.m.), frictionally contacted with the object (B) (knit piece of wool). The static charge thereupon built up on the sample (A) was measured. The measuring condition was 20° C. and 65% RH.

(3) Dye absorption.—A 0.02% aqueous solution of an acid dye (Xylene Fast Blue PR C.I. Acid Blue 129) of which pH was adjusted to 4 with acetic acid was used as the dyeing solution. Ten (10) grams of sample fibers were put in 1000 ml. of the dyeing solution at 98° C., and dyed for 60 minutes under an agitation at a constant rate. The absorbances of the solution before and after the dyeing were measured with an automatic recording spectrophotometer (product of Hitachi Seisakujo, Japan) and the dye absorption was calculated from the equation below.

$$\text{Dye absorption (percent)} = \frac{A_0 - A_1}{A_0} \times 100$$

$A_0$: absorbance of dyeing solution before dyeing,
$A_1$: absorbance of the solution after dyeing.

(4) Compression characteristics.—As the test sample, staple fiber was opened and stabilized by standing for a predetermined period.

Two (2) grams of the sample was stuffed in a cubic container of which each side was 4 cm., and compressed from the above with a square plate of 3.9 cm. x 3.9 cm., at a rate of 5 cm./min. until the pressure reached the level of 100 g./cm.² The sample was left under the compressed state for 2 minutes, and then the load was removed at the same rate of exertion. In this operation cycle, the following values were measured to express the compression characteristics of the sample.

Compressive energy (cm.g./cm.²):

The amount of work required for compressing the fiber mass. This value is correlated with the resistance felt by a person who grips the fiber mass, i.e., "stiffness" of the fiber.

Recovery energy (cm.g./cm.²):

The amount of work done by the fiber mass for the recovery from compression. This is correlated with the resilience of the fiber mass.

Resilience (percent):

$$\frac{\text{Recovery energy}}{\text{Compression energy}} \times 100$$

Resilience is correlated with "liveliness" of the fiber mass.

(5) Crimp characteristics—

Number of crimps:

The number of peaks present in 25 mm. of sample fiber which was under a load of 3 mg./d.

Crimp ratio, crimp elasticity:

These values were calculated as follows:

Crimp ratio (percent) = $l_1 - l_0 / l_1 - l_0 \times 100$
Crimp elasticity (percent) = $l_1 - l_2 / l_1 - l_0 \times 100$ $l_0$: length of crimped fiber under a load of 3 mg./d.,
$l_1$: length of the fiber under a load of 50 mg./d.,
$l_2$: length of the fiber after removal of the load of 50 mg./d., when a load of 3 mg./d. was again exerted thereto.

Crimp-elminating load:

The load under which the crimps in the sample fiber completely vanished. Until that point, the load was gradually increased.

All of the foregoing measurements were done in an atmosphere of controlled temperature and humidity of 20° C. and 65% RH.

(6) Equilibrium water content.—The water content at 66% RH, measured by conventional drying method, which was calculated as follows:

$$\text{Equilibrium water content} = \frac{W - W_0}{W} \times 100$$

W: weight of the sample moistened to equilibrium state,
$W_0$: weight of the dry sample.

The measurement was done at 20° C.

EXAMPLE A (1) Polyethylene glycol diamine (number average molecular weight: approximately 600) of a molecular formula $H_2NCH_2(CH_2CH_2O)_nCH_2CH_2CH_2NH_2$, which was prepared by cyanoethylation and subsequent hydrogenation of polyethylene glycol, was reacted with benzoic acid to form the diamine salt. 8.5 grams of the salt was mixed with 113 g. of anhydrous ε-caprolactam, and the mixture was heated to 220° C. in nitrogen current for 20 hours.

Thus obtained polymer was extracted with hot water for 16 hours. Its relative viscosity in m-cresol was 2.43.

(2) Polyethylene glycol diamine (number average molecular weight: approximately 1150) represented by the molecular formula of $H_2N(CH_2CH_2O)_nCH_2CH_2NH_2$, which was obtained by chlorination of end hydroxyl groups of polyethylene glycol and subsequent amination of the end groups, was reacted with acetic acid to form the diamine salt thereof. 12.7 grams of the salt was mixed with 141 g. of anhydrous η-capryl lactam, and the mixture was heated to 220° C. in nitrogen current for 20 hours.

Thus obtained polymer was extracted with hot water for 16 hours. Its relative viscosity in m-cresol was 2.36.

(3) Polyethylene glycol diamine (number average molecular weight: approximately 1150) having two terminal amino groups, which was prepared by cyanoethylation and subsequent hydrogenation of polyethylene glycol, was reacted with equimolar amount of adipic acid to form the diamine salt thereof. 13.0 grams of the salt was mixed with 113 g. of anhydrous ε-caprolactam, and the mixture was heated to 240° C. in nitrogen current for 20 hours.

Thus obtained polymer was extracted with hot water for 16 hours. The relative viscosity of the polymer in m-cresol was 2.49; amino group concentration thereof was $4.7 \times 10^{-5}$ mol/g., and the carboxyl group concentration was $4.1 \times 10^{-5}$ mol/g.

EXAMPLE B (1) Polyethylene glycol dicarboxylic acid having two end carboxyl groups, which was obtained by cyanoethylation of polyethylene glycol (number average molecular weight: approximately 2,000) and subsequent hydrolysis of the product with an aqueous acid, was reacted with equimolar amount of hexamethylenediamine. The resultant salt was mixed with anhydrous ε-caprolactam at such a ratio that the salt content of the mixture became 15 weight percent. The mixture was heated to 257° C. in nitrogen current for 15 hours. Thus the object block polyethercapramide was synthesized.

The polymeric product was extracted with hot water for 15 hours. Its relative viscosity in m-cresol was 2.29; amino group concentration was $4.1 \times 10^{-5}$ mol/g.; and carboxyl group concentration was $4.5 \times 10^{-5}$ mol/g.

(2) A salt composed of a polyethylene glycol dicarboxylic acid (number average molecular weight: approximately 1150) having two carboxyl group and hexamethylene-diamine was mixed with ε-caprolactam. The salt content of the mixture was 15 weight percent. The mixture was heated to 257° C. for 15 hours.

The polymeric product was extracted with hot water. The relative viscosity of the product in m-cresol was 2.31; amino group concentration was $4.7 \times 10^{-5}$ mol/g.; and carboxyl group concentration was $5.3 \times 10^{-5}$ mol/g.

(3) A salt composed of a polyethylene glycol (number average molecular weight: approximately 4,800) whose one end group was sealed with an alkyl group and the other end was carboxyl group and m-xylylenediamine, was mixed with ε-caprolactam. The salt content of the mixture was 35 weight percent. The mixture was polymerized in the manner similar to the preceding example, and the product was extracted with hot water.

The relative viscosity of the polymer in m-cresol was 2.53; the amino group concentration was $3.9 \times 10^{-5}$ mol/g.; and carboxyl group concentration was $4.0 \times 10^{-5}$ mol/g.

EXAMPLE C (1) A polyether of the molecular formula

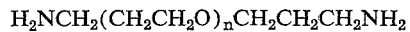

$H_2NCH_2(CH_2CH_2O)_nCH_2CH_2CH_2NH_2$ (average value of $n$: 20.6) which was obtained by cyanoethylation and subsequent hydrogenation of polyethylene glycol, was mixed with a polyamide of the formula

$OH[CO-(CH_2)_5-NH]_nCO(CH_2)_8 \cdot COOH$ (average value of $n$: 51.3) which was obtained by polymerization of ε-caprolactam with the addition of sebacic acid, at such a ratio that the mol ratio of amino group to carboxyl group became substantially 1:1. The mixture was put in a polymerization tank. After reducing the pressure inside the tank to 3 mm. Hg, the polymerization system was heated to 230° C. When the greater part of the polymeric mixture was melted, an agitation was started and continued for 10 hours. In the meantime, the temperature condition was maintained constant. The resultant product was extracted with hot water.

The analytical values of the product were as follows:

|  | Before polymerization, mol/g. | After polymerization, mol/g. |
| --- | --- | --- |
| Amino group concentration | $2.95 \times 10^{-4}$ | $8.1 \times 10^{-5}$ |
| Carboxyl group concentration | $2.01 \times 10^{-4}$ | $7.6 \times 10^{-5}$ |

Melting point: 201° C. Relative viscosity (in m-cresol): 2.25.

(2) A polyether of the molecular formula $$HOOC(CH_2 \cdot CH'_2O)_n CH_2 \cdot CH_2 \cdot COOH$$

(average value of $n$: 15.1) which was obtained by cyanoethylation and subsequent hydrolysis of polyethylene glycol was mixed with a polyamide of the formula $$NH_2(CH_2)_6 NH[CO—(CH_2)_5—NH]_n H$$

(average value of $n$: 22.3) which was obtained by polymerization of ε-caprolactam with the addition of hexamethylenediamine, at such a ratio that the mol ratio of amino group to carboxyl group became substantially 1:1. The mixture was poly-condensed at 220° C. under 3 mm. Hg for 10 hours.

The analytical values of the obtained polymer were as follows:

|  | Before polymerization, mol/g. | After polymerization, mol/g. |
| --- | --- | --- |
| Amino group concentration | $4.1 \times 10^{-4}$ | $5.2 \times 10^{-5}$ |
| Carboxyl group concentration | $4.3 \times 10^{-4}$ | $5.1 \times 10^{-5}$ |

Relative viscosity (in m-cresol): 2.43.

EXAMPLE 1

The salt of diamine and adipic acid derived from a polyethylene glycol (number average molecular weight: approximately 4,200) according to the procedure described in the foregoing Example A(3) was mixed with ε-caprolactam at such ratios to cause the polyethylene oxide content of the copolymer to become the values indicated in Table I. The mixtures were poly-condensed and processed in the accepted manner to produce the block polyethercapramides shown in Table I.

TABLE I

| Example No. | PEO segment content of BPEC (wt. percent) | Relative viscosity in m-cresol of BPEC |
| --- | --- | --- |
| I | 2 | 2.45 |
| II | 4 | 2.41 |
| III | 6 | 2.40 |
| IV | 9 | 2.43 |
| V | 12 | 2.39 |
| VI | 30 | 2.42 |
| VII | 54 | 2.40 |
| VIII | 65 | 2.39 |
| IX | 80 | 2.31 |
| X | 90 | 2.13 |

Notes.—BPEC=block polyethercapramide; PEO=polyethylene oxide.

From each of the block polyethercapramides I through X and polyethylene terephthalate (relative viscosity in o-chlorophenol: 1.77), side-by-side and core-in-sheath type composite fibers were prepared in accordance with the accepted practice. In the latter type composite fibers, block polyethercapramide was used as the sheath. Spinnability and the characteristics of the so prepared composite fibers are given in Tables II and III.

In Table II–A, the composite fibers of Run Nos. 1, 2, 17 and 18 are not within the scope of this invention. In these fibers, the adhesibility of the components were poor because of excessively low or high polyethylene oxide segment content of the block polyethercapramide. Consequently, their processability was poor due to the troubles caused by that deficiency. Furthermore, the fibers of Run Nos. 17 and 18 exhibited remarkably inferior chemical resistance.

In the product of Run No. 3, adhesibility of the block polyethercapramide with PET (polyethylene terephthalate) was not very good due to the low PEO (polyethylene oxide) content of the former, but this did not seriously impair the product's processability when the fiber was given a core-in-sheath structure. As to side-by-side structure, however, even the product of Run No. 5 having a somewhat higher PEO content (6 weight percent) showed an inferior processability. The best processability was obtained, as to core-in-sheath structure, at the PEO content of BPEC ranging from 3 to 85 weight percent (compare Run Nos. 1 with 3, and 15 with 17), particularly 8 to 60 weight percent (compare Run Nos. 4 with 6, and 11 with 13). As to side-by-side structure, the PEO content ranging from 8 to 85 weight percent (compare Run Nos. 5 with 7, and 16 with 18), particularly 10 to 60 weight percent (compare Run Nos. 7 with 8, and 12 with 14) appears preferable, from the standpoint of both processability and the properties of the composite fibers obtained.

TABLE II-A

| | Component of composite fiber | | | | | |
| --- | --- | --- | --- | --- | --- | --- |
| | First component (block polyethercapramide) | | | | Ratio between first and second components (wt.:wt.) | PEO content in fiber (wt. percent) |
| Run No. | No. | PEO a content (wt. percent) | Second component | Composite state | | |
| 1 | I | 2.0 | PET b | Core-in-sheath c | 3:1 | 1.5 |
| 2 | I | 2.0 | PET b | Side-by-side | 3:1 | 1.5 |
| 3 | II | 4.0 | PET b | Core-in-sheath | 3:1 | 3 |
| 4 | III | 6.0 | PET b | ...do... | 2:1 | 4 |
| 5 | III | 6.0 | PET b | Side-by-side | 2:1 | 4 |
| 6 | IV | 9.0 | PET b | Core-in-sheath | 1:1 | 4.5 |
| 7 | IV | 9.0 | PET b | Side-by-side | 1:1 | 4.5 |
| 8 | V | 12.0 | PET b | ...do... | 1:1 | 6 |
| 9 | VI | 30.0 | PET b | Core-in-sheath | 1:1 | 15 |
| 10 | VI | 30.0 | PET b | Side-by-side | 1:1 | 15 |
| 11 | VII | 54.0 | PET b | Core-in-sheath | 1:2 | 18 |
| 12 | VII | 54.0 | PET b | Side-by-side | 1:2 | 18 |
| 13 | VIII | 65.0 | PET b | Core-in-sheath | 1:2 | 21.7 |
| 14 | VIII | 65.0 | PET b | Side-by-side | 1:2 | 21.7 |
| 15 | IX | 80.0 | PET b | Core-in-sheath | 1:3 | 20 |
| 16 | IX | 80.0 | PET b | Side-by-side | 1:3 | 20 |
| 17 | X | 90.0 | PET b | Core-in-sheath | 1:3 | 22.5 |
| 18 | X | 90.0 | PET b | Side-by-side | 1:3 | 22.5 |

TABLE II-A—Continued

| | Spinnability[d] | Drawability[d] | Adhesibility[d] | Frictional static charge (v.) | Strength retention (percent) | Remarks |
|---|---|---|---|---|---|---|
| Run No.: | | | | | | |
| 1 | Very good | Very poor | Very poor | 2,060 | 92.5 | Processibility poor. |
| 2 | Very poor | do | do | 2,530 | 92.8 | Do. |
| 3 | Very good | Good | do | 1,580 | 84.9 | |
| 4 | do | do | Poor | 1,100 | 84.8 | |
| 5 | Good | Poor | do | 1,350 | 86.5 | Processibility rather poor. |
| 6 | Very good | Very good | Good | 1,010 | 82.6 | |
| 7 | do | Good | do | 1,280 | 84.5 | |
| 8 | do | Very good | Very good | 1,070 | 80.8 | |
| 9 | do | do | do | 640 | 63.7 | |
| 10 | do | do | do | 790 | 64.3 | |
| 11 | do | do | do | 440 | 71.0 | |
| 12 | do | do | do | 560 | 72.5 | |
| 13 | do | Good | do | 370 | 68.5 | |
| 14 | Good | do | do | 450 | 71.0 | |
| 15 | do | Middle | do | 385 | 75.5 | |
| 16 | Middle | do | Middle | 475 | 77.0 | |
| 17 | do | Very poor | Very poor | 290 | 72.3 | Poor processibility and chemical resistance. |
| 18 | Very poor | do | do | 370 | 74.0 | Do. |

[a] PEO=polyethylene oxide.
[b] PET=polyethylene terephthalate.
[c] PET was core, and BPEC was the sheath.
[d] Degree of goodness:
   Very good, first grade.
   Good, second grade.
   Middle, third grade.
   Poor, fourth grade.
   Very poor, fifth grade.

TABLE II-B

[The data given in this table are those as the core-in-sheath type composite fibers given in Table II-A]

| | Component of composite fiber | | | | | |
|---|---|---|---|---|---|---|
| | First component (block polyethercapramide) | | Second component | Composite state | Ratio between first and second components (wt.:wt.) | EPO content in fiber (wt. percent) |
| | No. | EPO content (wt. percent) | | | | |
| Run No.: | | | | | | |
| 1 | I | 2.0 | PET[a] | core-in-sheath[b] | 3:1 | 1.5 |
| 3 | II | 4.0 | PET[a] | do | 3:1 | 3 |
| 4 | III | 6.0 | PET[a] | do | 2:1 | 4 |
| 6 | IV | 9.0 | PET[a] | do | 1:1 | 4.5 |
| 9 | VI | 30.0 | PET[a] | do | 1:1 | 15 |
| 11 | VII | 54.0 | PET[a] | do | 1:2 | 18 |
| 13 | VIII | 65.0 | PET[a] | do | 1:2 | 21.7 |
| 15 | IX | 80.0 | PET[a] | do | 1:3 | 20 |
| 17 | X | 90.0 | PET[a] | do | 1:3 | 22.5 |

| | Spinnability | Drawability | Adhesibility | Frictional static charge (v.) | Strength retention (percent) | Remarks |
|---|---|---|---|---|---|---|
| Run No.: | | | | | | |
| 1 | Very good | Very poor | Very poor | 2,060 | 92.5 | Processibility poor. |
| 3 | do | Good | do | 1,580 | 84.9 | |
| 4 | do | do | Poor | 1,100 | 84.8 | |
| 6 | do | Very good | Good | 1,010 | 82.6 | |
| 9 | do | do | Very good | 640 | 63.7 | |
| 11 | do | do | do | 440 | 71.0 | |
| 13 | do | Good | do | 370 | 68.5 | |
| 15 | Good | Middle | Middle | 385 | 75.5 | |
| 17 | Middle | Very poor | Very poor | 290 | 72.3 | Poor processibility and chemical resistance. |

[a] PET=polyethylene terephthalate.
[b] PET was the core, and BPEC (block polyethercapramide) was the sheath.

TABLE II-C

[The data given in this table are those as to side-by-side type composite fibers given in Table II-A]

| | Component of composite fiber | | | | | | Fiber properties | | |
|---|---|---|---|---|---|---|---|---|---|
| | First component (BPEC) [a] | | Ratio of first component to second component (PET) [c] (wt. percent) | PEO content in fiber (wt. percent) | Spinnability | Drawability | Adhesibility | Frictional static charge (v.) | Strength retention (percent) | Remarks |
| | No. | PEO [b] content (wt. percent) | | | | | | | | |
| Run No.: | | | | | | | | | | |
| 2 | I | 2.0 | 3:1 | 1.5 | Very poor | Very poor | Very poor | 2,530 | 92.8 | Processibility poor. |
| 5 | III | 6.0 | 2:1 | 4.0 | Good | Poor | Poor | 1,350 | 86.5 | Processibility rather poor. |
| 7 | IV | 9.0 | 1:1 | 4.5 | Very good | Good | Good | 1,280 | 84.5 | |
| 8 | V | 12.0 | 1:1 | 6.0 | do | Very good | Very good | 1,070 | 80.0 | |
| 10 | VI | 30.0 | 1:1 | 15.0 | do | do | do | 790 | 64.3 | |
| 12 | VII | 54.0 | 1:2 | 18.0 | do | do | do | 560 | 72.5 | |
| 14 | VIII | 65.0 | 1:2 | 21.7 | Good | Good | do | 450 | 71.0 | |
| 16 | IX | 80.0 | 1:3 | 20.0 | Middle | Middle | Middle | 475 | 77.0 | |
| 18 | X | 90.0 | 1:3 | 22.5 | Very poor | Very poor | Very poor | 370 | 74.0 | Poor processibility and chemical resistance. |

[a] BPEC = Block polyethercapramide.
[b] PEO = polyethylene oxide.
[c] PET = polyethylene terephthalate.

Table III is given for the purpose of illustrating the significance of polyethylene oxide segment content of the composite fiber.

The core-in-sheath type composite fiber of Run No. 1 is outside the scope of this invention, which exhibited poor antistatic property (above 3,000 v.) and poor processibility, due to the excessively low polyethylene oxide segment content.

Although Run No. 6 belongs to the scope of the invention, the product side-by-side composite fiber had a somewhat inferior antistatic property to that of core-in-sheath type fiber. Therefore, for side-by-side structure, it is desirable for the fiber to contain no less than 1.0 weight percent of polyethylene oxide.

The polyethylene oxide segment contents of the products of Run Nos. 5 and 10 exceeded the upper limit specified in this invention. As indicated in the table, the products had poor heat resistance, substantiated by poor strength retention (below 60%).

The polyethylene oxide content of the composite fiber which will give good processibility as well as good fiber properties, ranges from 0.3 to 30 weight percent (cf. Run Nos. 1, 2 and 4, 5), particularly 0.8–30 weight percent (cf. Run Nos. 2, 3 and 4, 5), for core-in-sheath structure, and from 0.8 to 30 weight percent (cf. Run Nos. 6, 7 and 9, 10), particularly 1.0 to 30 weight percent (cf. Run Nos. 7, 8 and 9, 10) for side-by-side structure.

TABLE III

| | Component of composite fiber | | | | | |
|---|---|---|---|---|---|---|
| | First component (BPEC) | | Composite state | Ratio of first component to second component (PET) (wt. percent) | PEO content in fiber (wt. percent) | Spinnability |
| | No. | PEO content (wt. percent) | | | | |
| Run No.: | | | | | | |
| 1 | I | 2 | Core-in-sheath | 1:9 | 0.2 | Good. |
| 2 | III | 6 | do | 1:9 | 0.6 | Very good. |
| 3 | V | 12 | do | 1:9 | 1.2 | Do. |
| 4 | VII | 54 | do | 1:1 | 27 | Do. |
| 5 | VIII | 65 | do | 1:1 | 32.5 | Do. |
| 6 | III | 6 | Side-by-side | 1:9 | 0.6 | Middle. |
| 7 | IV | 9 | do | 1:9 | 0.9 | Very good. |
| 8 | V | 12 | do | 1:9 | 1.2 | Do. |
| 9 | VII | 54 | do | 1:1 | 27 | Do. |
| 10 | VIII | 65 | do | 1:1 | 32.5 | Good. |

| | Drawability | Adhesibility | Frictional static charge (v.) | Strength retention (percent) | Remarks |
|---|---|---|---|---|---|
| Run No.: | | | | | |
| 1 | Very poor | Very poor | 3,450 | 98.0 | Poor antistatic property. |
| 2 | Good | Poor | 2,970 | 96.5 | |
| 3 | Very good | Very good | 2,200 | 94.2 | |
| 4 | do | do | 200 | 60.3 | |
| 5 | Good | do | 130 | 55.1 | Poor heat resistance. |
| 6 | Very poor | Poor | 3,350 | 96.8 | Poor antistatic property. |
| 7 | Middle | Good | 2,910 | 94.3 | |
| 8 | Very good | Very good | 2,750 | 92.8 | |
| 9 | do | do | 250 | 61.2 | |
| 10 | Good | do | 160 | 56.2 | Poor heat resistance. |

EXAMPLE 2

Salts of diamines which were derived from polyethylene oxides of various degrees of polymerization as indicated in Table IV and adipic acid by the procedure described in Example A(3), were mixed with ε-caprolactam at such ratios to cause the polyethylene oxide segment contents of product copolymers to become the values given in the said table. The mixtures were polycondensed and processed in the accepted manner to yield the block polyethercapramides as specified in the same table.

TABLE IV

| Number: | Average recurring unit number of EO in PEO segment in BPEC | PEO segment content of BPEC (wt. percent) | Relative viscosity in m-cresol of BPEC |
|---|---|---|---|
| A-I | 15 | 24 | 2.36 |
| A-II | 21 | 24 | 2.38 |
| A-III | 30 | 24 | 2.39 |
| A-IV | 64 | 24 | 2.38 |
| A-V | 125 | 24 | 2.37 |
| A-VI | 155 | 24 | 2.43 |
| A-VII | 170 | 24 | 2.48 |
| A-VIII | 200 | 24 | 2.88 |
| A-IX | 64 | 8 | 2.41 |

Note.—EO=ethylene oxide.

Separately, four types of block polyesteramides as listed in Table V below were prepared from a polycapramide of molecular weight of approximately 5,000 and a polyethylene terephthalate (PET) of a molecular weight of approximately 10,200.

TABLE V

| Number: | Copolymer composition (PET/polycapramide) (wt./wt.) | Relative viscosity of copolymer in o-chlorophenol |
|---|---|---|
| B-I | 95/5 | 1.87 |
| B-II | 85/15 | 1.89 |
| B-III | 75/25 | 1.93 |
| B-IV | 65/35 | 1.93 |

From each of the block polyethercapramides A-I through A-VIII and a polyethylene terephthalate which had a relative viscosity in o-chlorophenol of 1.73, side-by-side and core-in-sheath composite fibers were prepared by the means known per se.

Also from the block polyethercapramides IV and IX and the block polyesteramides B-I through B-IV, side-by-side composite fibers were prepared by the means known per se (Run Nos. 9-13).

From the block polyethercapramide IV and the block polyesteramides B-I through B-IV, core-in-sheath type composite fibers were prepared by the means known per se (Run Nos. 22-25).

The spinnability and the properties of the composite fibers obtained in each run are shown in Table VI.

In Table VI, the products of Run Nos. 1, 8, 14 and 21 exhibited satisfactory properties, but the operability of composite fiber preparation from block polyethercapramide A-I or A-III and polyethylene terephthalate was somewhat inferior. The processibility depends on the recurring unit number of ethylene oxide in the polyethylene oxide segment of block polyethercapramide. Accordingly, the preferred recurring unit number ranges approximately 20-180 (compare Run Nos. 1 with 2, 7 with 8, 14 with 15, and 20 with 21), and the optimum range appears to be 25-140 (compare Run Nos. 2 with 3, 5 with 6, 15 with 16 and 18 with 19).

Run Nos. 9-13 and 22-25 are the examples in which modified polyesters were used as a component of composite fibers. The products of Run Nos. 13 and 25 are objectionable in that their initial modulus was extremely low, due to the excessively large amount of polyamide segments in the block polyesteramide employed.

For a polyamide-modified polyester to exhibit the adhesibility and dyeability-improving effect, when used as a component of composite fibers, without appreciably detrimental effect on other fiber properties, its polyamide segment content must not exceed the upper limit of 30 weight percent (compare Run Nos. 12 with 13, and 24 with 25). Particularly, the optimum polyamide segment content ranges from 10 to 30 weight percent. As indicated by the result of Run No. 12, when such a modified polyester is used as the polyester component, even the block polyethercapramide containing 8 weight percent of polyethylene oxide can be satisfactorily combined therewith to form side-by-side composite fibers.

TABLE VI

| | First component (block polyethercapramide) | | Second component (composition of copolymer) | Composite state | Ratio between the first and second component (wt.:wt.) | PEO content of fiber (wt. percent) |
|---|---|---|---|---|---|---|
| Run No.: | No. | Number of recurring unit of EO | | | | |
| 1 | A-I | 15 | PET | Side-by-side | 1:1 | 12 |
| 2 | A-II | 21 | PET | do | 1:1 | 12 |
| 3 | A-III | 30 | PET | do | 1:1 | 12 |
| 4 | A-IV | 64 | PET | do | 1:1 | 12 |
| 5 | A-V | 125 | PET | do | 1:1 | 12 |
| 6 | A-VI | 155 | PET | do | 1:1 | 12 |
| 7 | A-VII | 170 | PET | do | 1:1 | 12 |
| 8 | A-VIII | 200 | PET | do | 1:1 | 12 |
| 9 | A-IV | 64 | Block polyesteramide:B-I, 95/5 | do | 1:1 | 12 |
| 10 | A-IV | 64 | Block polyesteramide:B-II, 85/15 | do | 1:1 | 12 |
| 11 | A-IV | 64 | Block polyesteramide:B-III, 75/25 | do | 1:1 | 12 |
| 12 | A-IX | 64 | Block polyesteramide:B-III, 75/25 | do | 1:1 | 4 |
| 13 | A-IV | 64 | Block polyesteramide:B-IV, 65/35 | do | 1:1 | 12 |
| 14 | A-I | 15 | PET | Core-in-sheath a | 1:1 | 12 |
| 15 | A-II | 21 | PET | do | 1:1 | 12 |
| 16 | A-III | 30 | PET | do | 1:1 | 12 |
| 17 | A-IV | 64 | PET | do | 1:1 | 12 |
| 18 | A-V | 125 | PET | do | 1:1 | 12 |
| 19 | A-VI | 155 | PET | do | 1:1 | 12 |
| 20 | A-VII | 170 | PET | do | 1:1 | 12 |
| 21 | A-VIII | 200 | PET | do | 1:1 | 12 |
| 22 | A-IV | 64 | Block polyesteramide:B-I, 95/15 | do | 1:1 | 12 |
| 23 | A-IV | 64 | Block polyesteramide:B-II, 85/15 | do | 1:1 | 12 |
| 24 | A-IV | 64 | Block polyesteramide:B-III, 75/25 | do | 1:1 | 12 |
| 25 | A-IV | 64 | Block polyesteramide:B-IV, 65/35 | do | 1:1 | 12 |

TABLE VI—Continued

| | | | | Fiber properties | | | |
|---|---|---|---|---|---|---|---|
| | Spinnability | Drawability | Adhesibility | Frictional static charge (v.) | Dye absorption (percent) | Initial modulus (g./d.) | Remarks |
| Run No.: | | | | | | | |
| 1 | Good | Poor | Good | 1,320 | 68.2 | 43.2 | Processability rather poor. |
| 2 | Good | Good | do | 1,100 | 67.5 | 52.6 | |
| 3 | Very good | Very good | Very good | 950 | 67.5 | 56.5 | |
| 4 | do | do | do | 910 | 65.4 | 60.3 | |
| 5 | do | do | do | 870 | 64.9 | 65.5 | |
| 6 | do | do | do | 860 | 59.7 | 66.8 | |
| 7 | Good | Good | Good | 950 | 59.1 | 67.5 | |
| 8 | Poor | Poor | Poor | 1,020 | 57.3 | 65.3 | Processability rather poor. |
| 9 | Very good | Very good | Very good | 950 | 67.5 | 56.3 | |
| 10 | do | do | do | 830 | 70.3 | 50.5 | |
| 11 | do | do | do | 740 | 72.6 | 39.8 | |
| 12 | do | do | do | 1,290 | 78.5 | 45.3 | |
| 13 | do | do | do | 630 | 76.3 | 28.5 | Initial modulus low. |
| 14 | do | Poor | Poor | 1,040 | 70.5 | 43.8 | Processability rather poor. |
| 15 | do | Good | do | 890 | 69.8 | 53.6 | |
| 16 | do | Very good | Very good | 770 | 71.5 | 56.3 | |
| 17 | do | do | do | 740 | 70.8 | 61.5 | |
| 18 | do | do | do | 710 | 70.1 | 66.3 | |
| 19 | do | Good | do | 695 | 67.3 | 67.8 | |
| 20 | Good | do | Good | 780 | 68.1 | 67.3 | |
| 21 | Poor | Poor | Poor | 860 | 66.5 | 66.4 | Processability rather poor. |
| 22 | Very good | Very good | Very good | 750 | 70.6 | 57.3 | |
| 23 | do | do | do | 680 | 78.5 | 51.5 | |
| 24 | do | do | do | 600 | 82.6 | 38.7 | |
| 25 | do | do | do | 540 | 88.6 | 29.3 | Initial modulus low. | a Core-in-sheath structure: PET was the core and BPEC was the sheath.

EXAMPLE 3

The salt of a diamine derived from a polyethylene glycol (number average molecular weight: approximately 4,800) and adipic acid by the procedure described in Example A(3) was mixed with ε-caprolactam at such ratios that the copolymers' polyethylene oxide segment contents should become the values indicated in Table VII. The mixtures were polycondensed and processed in the accepted manner. Thus block polyethercapramides I through IV as listed in the same table were obtained.

TABLE VII

| | PEO segment content of BPEC (wt. percent) | Relative viscosity of BPEC m-cresol |
|---|---|---|
| Number: | | |
| I | 24 | 2.41 |
| II | 64 | 2.33 |
| III | 80 | 2.25 |
| IV | 90 | 2.08 |

Each of the block polyethercapramides I through IV was mixed with a polycapramide having a relative viscosity in m-cresol of 2.49. Each of the mixtures was used to form side-by-side and core-in sheath composite fibers, together with a polyethylene terephthalate having a relative viscosity in o-chlorophenol of 1.75.

The spinnability and the properties of the composite fibers obtained in each run are shown in Table VIII.

In Table VIII-A, the filamemnts of Run Nos. 1, 2, 17 and 18 are outside the scope of this invention. Their adhesibility were poor due to the excessively high or low polyethylene oxide segment contents of the mixtures of the block polyethercapramide and polycapramide. And, due to the troubles caused by the poor adhesibility, their processibility was also poor. Again the fibers of Run Nos. 17 and 18 exhibited poor chemical resistance.

The adhesibility of the components employed in Run No. 3 was not very good due to the rather low polyethylene oxide segment content of the mixture, but it was not a very serious problem in the preparation of core-in-sheath composite fiber. In contrast, in the preparation of side-by-side composite fiber, local separation of the two components during drawing was observed even when the polyethylene oxide content of the mixture was 6 weight percent (Run No. 5).

The processibility depends on the polyethylene oxide segment content of the mixture of block polyethercapramide and polycapramide. In the case of core-in-sheath type fibers, the range of 3–85 weight percent (compare Run Nos. 1 with 3, and 15 with 17), particularly 8–60 weight percent (compare Run Nos. 4 with 6, and 11 with 13) appears to be appropriate. As to side-by-side structure, that of 8–85 weight percent (compare Run Nos. 5 with 7, and 16 with 18), inter alia, 10–60 weight percent (compare Run Nos. 7 with 8, and 12 with 14) is preferred.

TABLE VIII-A

| | Component of composite fiber | | | | | | |
|---|---|---|---|---|---|---|---|
| | First component (mixture of block polyethercapramide and polycapramide) | | | | | Ratio between the first and second component (wt.:wt.) | PEO content of fiber (wt percent) |
| | Mixing ratio (BPEC:PCA) | PEO content of mixture (wt. percent) | Second component | Composite state | | | |
| Run No.: | | | | | | | |
| 1 | BPEC (24%):PPCA, 1:9a | 2.4 | PET | Core-in-sheathb | | 2:1 | 1.6 |
| 2 | BPEC(24%):PCA, 1:9 | 2.4 | PET | Side-by-side | | 2:1 | 1.6 |
| 3 | BPEC(24%):PCA, 1:5 | 4.0 | PET | Core-in-sheath | | 2:1 | 2.7 |
| 4 | BPEC (24%):PCA, 1:3 | 6.0 | PET | do | | 2:1 | 4.0 |
| 5 | BPEC (24%):PCA, 1:3 | 6.0 | PET | Side-by-side | | 2:1 | 4.0 |
| 6 | BPEC (24%):PCA, 1:1.5 | 9.6 | PET | Core-in-sheath | | 2:1 | 6.4 |
| 7 | BPEC (24%):PCA, 1:1.5 | 9.6 | PET | Side-by-side | | 2:1 | 6.4 |
| 8 | BPEC (24%):PCA, 1:1 | 12.0 | PET | do | | 1:1 | 6.0 |
| 9 | BPEC (64%):PCA, 1:1 | 32.0 | PET | Core-in-sheath | | 1:1 | 16.0 |
| 10 | BPEC (64%):PCA, 1:1 | 32.0 | PET | Side-by-side | | 1:1 | 16.0 |
| 11 | BPEC (80%):PCA, 2:1 | 53.3 | PET | Core-in-sheath | | 1:2 | 17.8 |
| 12 | BPEC (80%):PCA, 2:1 | 53.3 | PET | Side-by-side | | 1:2 | 17.8 |
| 13 | BPEC (80%):PCA, 4:1 | 64.0 | PET | Core-in-sheath | | 1:2 | 21.3 |
| 14 | BPEC (80%):PCA, 4:1 | 64.0 | PET | Side-by-side | | 1:2 | 21.3 |
| 15 | BPEC (90%):PCA, 5:1 | 75.0 | PET | Core-in-sheath | | 1:2 | 25.0 |
| 16 | BPEC (90%):PCA, 5:1 | 75.0 | PET | Side-by-side | | 1:2 | 25.0 |
| 17 | BPEC (90%):PCA, 19:1 | 85.5 | PET | Core-in-sheath | | 1:2 | 28.5 |
| 18 | BPEC (90%):PCA, 19:1 | 85.5 | PET | Side-by-side | | 1:2 | 28.5 |

TABLE VIII-A—Continued

| | Spinnability | Drawability | Adhesibility | Frictional static charge (v.) | Strength retention (percent) | Remarks |
|---|---|---|---|---|---|---|
| Run No.: | | | | | | |
| 1 | Good | Very poor | Very poor | 746 | 91.5 | Processibility poor. |
| 2 | Very poor | do | do | 930 | 92.6 | Do. |
| 3 | Very good | Good | do | 720 | 90.0 | |
| 4 | do | Very good | Poor | 550 | 85.6 | |
| 5 | Good | Poor | do | 730 | 86.9 | Processibility poor. |
| 6 | Very good | Very good | Good | 405 | 79.5 | |
| 7 | do | Good | do | 480 | 84.3 | |
| 8 | do | Very good | Very good | 515 | 81.5 | |
| 9 | do | do | do | 113 | 79.3 | |
| 10 | do | do | do | 138 | 82.6 | |
| 11 | Very good | Very good | Very good | 105 | 76.2 | |
| 12 | do | do | do | 125 | 79.3 | |
| 13 | do | Good | do | 60 | 70.5 | |
| 14 | Good | do | do | 70 | 74.8 | |
| 15 | do | Middle | Middle | 15 | 66.3 | |
| 16 | Middle | do | do | 30 | 70.1 | |
| 17 | do | Very poor | Very poor | 0–10 | 58.8 | Processibility and chemical resistance poor. |
| 18 | Very poor | do | do | 0–10 | 62.7 | Do. |

ᵃBPEC (24%) means that PEO content of block polyethercapramide was 24 wt. percent PCA polycapramide.
ᵇCore-in-sheath structure: PET was the core and BPEC/PCA was the sheath.
NOTE.—BPEC/PCA means the mixture of BPEC and PCA.

TABLE VIII-B

[Among the data given in Table III-A, those on core-in-sheath structure fibers only are extracted in this table.]

| | Component of composite fiber | | | | | |
|---|---|---|---|---|---|---|
| | First component (mixture of block polyethercapro-amide and polycapramide) | | Second component | Composite state | Ratio between the first and second component (wt.:wt.) | PEO content of fiber (wt. percent) |
| | Mixing ratio (BPEC:PCA) | PEO content of mixture (wt. percent) | | | | |
| Run No.: | | | | | | |
| 1 | BPEC(24%):PCA, 1:9 ᵃ | 2.4 | PET | Core-in-sheath ᵇ | 2:1 | 1.6 |
| 3 | PBEC(24%):PCA, 1:5 | 4.0 | PET | do | 2:1 | 2.7 |
| 4 | BPEC(24%):PCA, 1:3 | 6.0 | PET | do | 2:1 | 4.0 |
| 6 | BPEC(24%):PCA, 1:1.5 | 9.6 | PET | do | 2:1 | 6.4 |
| 9 | PBEC(64%):PCA, 1:1 | 32.0 | PET | do | 1:1 | 16.0 |
| 11 | BPEC(80%):PCA, 2:1 | 53.3 | PET | do | 1:2 | 17.8 |
| 13 | BPEC(80%):PCA, 4:1 | 64.0 | PET | do | 1:2 | 21.3 |
| 15 | BPEC(90%):PCA, 5:1 | 75.0 | PET | do | 1:2 | 25.0 |
| 17 | BPEC(90%):PCA, 19:1 | 85.5 | PET | do | 1:2 | 28.5 |

| | Spinnability | Drawability | Adhesibility | Frictional static charge (v.) | Strength retention (percent) | Remarks |
|---|---|---|---|---|---|---|
| Run No: | | | | | | |
| 1 | Good | Very poor | Very poor | 746 | 91.5 | Processibility poor. |
| 3 | Very good | Good | Very poor | 720 | 90.0 | |
| 4 | do | Very good | Poor | 550 | 85.6 | |
| 6 | do | do | Good | 405 | 79.5 | |
| 9 | do | do | Very good | 113 | 79.3 | |
| 11 | do | do | do | 105 | 76.2 | |
| 13 | do | Good | do | 60 | 70.5 | |
| 15 | Good | Middle | Middle | 15 | 66.3 | |
| 17 | Middle | Very poor | Very poor | 0–10 | 58.8 | Processibility and chemical resistance poor. |

ᵃ BPEC (24%) means that PEO content of block polyethercapramide and 24 wt percent. PCA polycapramide.
ᵇ Core-insheath structure: PET was the core and BPEC/PCA was the sheath.

TABLE VIII-C

[Among the data given in Table VIII-A, those on side-by-side structure fibers only are extracted in this table.]

| | Component of composite fiber | | | | | |
|---|---|---|---|---|---|---|
| | First component (mixture of block polyethercapro-amide and polycapramide) | | Second component | Composite state | Ratio between the first and second component (wt.:wt.) | PEO content of fiber (wt. percent) |
| | Mixing ratio (BPEC:PCA) | PEO content of mixture (wt. percent) | | | | |
| Run No.: | | | | | | |
| 2 | BPEC(24%):PCA, 1:9 ᵃ | 2.4 | PET | Side-by-side | 2:1 | 1.6 |
| 5 | BPEC(24%):PCA, 1:3 | 6.0 | PET | do | 2:1 | 4.0 |
| 7 | BPEC(24%):PCA, 1:1.5 | 9.6 | PET | do | 2:1 | 6.4 |
| 8 | BPEC(24%):PCA, 1:1 | 12.0 | PET | do | 1:1 | 6.0 |
| 10 | BPEC(64%):PCA, 1:1 | 32.0 | PET | do | 1:1 | 16.0 |
| 12 | BPEC(80%):PCA, 2:1 | 53.3 | PET | do | 1:2 | 17.8 |
| 14 | BPEC(80%):PCA, 4:1 | 64.0 | PET | do | 1:2 | 21.3 |
| 16 | BPEC(90%):PCA, 5:1 | 75.0 | PET | do | 1:2 | 25.0 |
| 18 | BPEC(90%):PCA, 19:1 | 85.5 | PET | do | 1:2 | 28.5 |

TABLE VIII-C—Continued

| | | | | Fiber properties | | |
|---|---|---|---|---|---|---|
| | Spinnability | Drawability | Adhesibility | Frictional static charge (v.) | Strength retention (percent) | Remarks |
| Run No.: | | | | | | |
| 2 | Very poor | Very poor | Very poor | 930 | 92.6 | Processibility. |
| 5 | Good | Poor | Poor | 730 | 86.9 | Do. |
| 7 | Very good | Good | Good | 480 | 84.3 | |
| 8 | do | Very good | Very good | 515 | 81.5 | |
| 10 | do | do | do | 138 | 82.6 | |
| 12 | do | do | do | 125 | 79.3 | |
| 14 | Good | Good | do | 70 | 74.8 | |
| 16 | Middle | Middle | Middle | 30 | 70.1 | |
| 18 | Very poor | Very poor | Very poor | 0–10 | 62.7 | Processibility and chemical resistance poor. | a BPEC (24%) means that PEO content of block polyethercapramide was 24 wt. percent.

The significance of polyethylene oxide segment content of composite fibers is illustrated in Table IX.

The composite fibers obtained in Run Nos. 1 and 6 exhibited rather poor processibility, because of the poor adhesibility of the components due to the low polyethylene oxide segment contents of the fibers. Whereas, excessively high polyethylene oxide content causes poor heat resistance as indicated by the unsatisfactory strength retention (below 60%) of the products of Run Nos. 5 and 10.

From the results given in Table IX, the preferred range of polyethylene oxide content of the fibers as to each structure appears to be as follows:

Core-in-sheath structure—

0.3–30 weight percent (cf. Run Nos. 1, 2 and 4, 5), particularly 0.8–30 weight percent (cf. Run Nos. 2, 3 and 4, 5).

Side-by-side structure—

0.8–30 weight percent (cf. Run Nos. 6, 7 and 9, 10), particularly 1.0–30 weight percent (cf. Run Nos. 7, 8 and 9, 10).

TABLE X

| Number: | Average number of EO recurring unit in PEO segment of BPEC | PEO segment content of BPEC (wt. percent) | Relative viscosity of BPEC in m-cresol |
|---|---|---|---|
| A–I | 15 | 48 | 2.35 |
| A–II | 21 | 48 | 2.39 |
| A–III | 30 | 48 | 2.42 |
| A–IV | 64 | 48 | 2.40 |
| A–V | 125 | 48 | 2.44 |
| A–VI | 155 | 48 | 2.39 |
| A–VII | 170 | 48 | 2.38 |
| A–VIII | 200 | 48 | 2.41 |

Separately, from a polycapramide of a molecular weight of approximately 3,200 and a polyethylene terephthalate of a molecular weight of approximately 9,800, the following four types of block polyesteramide were prepared.

TABLE XI

| | Composition of copolymer (PET/polycapramide wt./wt.) | Relative viscosity of copolymer in o-chlorophenol |
|---|---|---|
| B–I | 95/5 | 1.90 |
| B–II | 85/15 | 1.92 |
| B–III | 75/25 | 1.95 |
| B–IV | 65/35 | 1.94 |

TABLE IX

Component of composite fiber

| | First component (mixture of block polyethercaproamide and polycapramide) | | | | | | |
|---|---|---|---|---|---|---|---|
| | Mixing ratio (BPEC:PCA) | PEO content of mixture (wt. percent) | Second component | Composite state | Ratio between the first and second component (wt.:wt.) | PEO content of fiber (wt. percent) | |
| Run No.: | | | | | | | |
| 1 | BPEC(24%):PCA, 1:9 a | 2.4 | PET | Core-in-sheath b | 1:9 | 0.24 | |
| 2 | BPEC(24%):PCA, 1:3 | 6.0 | PET | do | 1:9 | 0.6 | |
| 3 | BPEC(24%):PCA, 1:1 | 12.0 | PET | do | 1:9 | 1.2 | |
| 4 | BPEC(64%):PCA, 1:1 | 32.0 | PET | do | 3:1 | 24.0 | |
| 5 | BPEC(80%):PCA, 1:1 | 40.0 | PET | do | 4:1 | 32.0 | |
| 6 | BPEC(24%):PCA, 1:3 | 6.0 | PET | Side-by-side | 1:9 | 0.6 | |
| 7 | BPEC(24%):PCA, 1:2 | 8.0 | PET | do | 1:8 | 0.89 | |
| 8 | BPEC(24%):PCA, 1:1 | 12.0 | PET | do | 1:9 | 1.2 | |
| 9 | BPEC(64%):PCA, 1:1 | 32.0 | PET | do | 3:1 | 24.0 | |
| 10 | BPEC(80%):PCA, 1:1 | 40.0 | PET | do | 4:1 | 32.0 | |

| | | | | Fiber properties | | |
|---|---|---|---|---|---|---|
| | Spinnability | Drawability | Adhesibility | Frictional static charge (v.) | Strength retention (percent) | Remarks |
| Run No.: | | | | | | |
| 1 | Middle | Very poor | Very poor | 1,320 | 96.8 | Processibility poor. |
| 2 | Very good | Good | Poor | 1,200 | 96.2 | |
| 3 | do | Very good | Very good | 980 | 94.6 | |
| 4 | do | do | do | 20 | 62.3 | |
| 5 | do | do | do | 0–10 | 41.5 | Heat resistance poor. |
| 6 | Very poor | Very poor | Poor | 1,500 | 97.2 | Processibility poor. |
| 7 | Good | Middle | Good | 1,440 | 95.3 | |
| 8 | Very good | Very good | Very good | 1,320 | 92.1 | |
| 9 | do | do | do | 35 | 66.5 | |
| 10 | do | do | do | 0–10 | 45.3 | Heat resistance poor. | a BPEC (24%) means that PEO content of block polyethercapramide was 24 wt. percent PCA polycapramide.
b Core-in-sheath structure: PET was the core and BPEC/PCA was the sheath.

EXAMPLE 4

Eight (8) types of block polyethercapramides were synthesized by the procedures described in Example A(3) as in the following Table X.

Using a mixture of each of the block polyethercapramides A–I through A–VIII and a polycapramide having a relative viscosity in m-cresol of 2.38 as the first component, and a polyethylene terephthalate having a relative viscosity in o-chlorophenol of 1.73 as the second component, side-by-side and core-in-sheath type composite fibers were prepared in the accepted manner (Run Nos. 1–8 and 13–20).

Separately, from the mixture of block polyethercapramide A–IV and the polycapramide as the first component and each of the block polyesteramides B–I through B–IV as the second component, side-by-side and core-in-sheath structure composite fibers were prepared in the accepted manner (Run Nos. 9–12, and 21–24). The spinnability and the properties of the product of each run are shown in Table XII.

In the same table, the products of Run Nos. 1, 8, 13 and 20 exhibited satisfactory properties, but the processibility was somewhat inferior in the cases of employing the mixture of either block polyethercapramide A–I or A–VIII and the polycapramide, and the polyethylene terephthalate.

The processibility depends on the number of ethylene oxide recurring units in the polyethylene oxide segment of block polyethercapramide. From the empirical results, the recurring unit numbers of approximately 20–180 (compare Run Nos. 1 with 2, 7 with 8, 13 with 14, and 19 with 20), particularly 25–140 (compare Run Nos. 2 with 3, 5 with 6, 14 with 15 and 17 with 18) appear to be the most advantageous.

Among the runs employing the modified polyesters as one of the components of the fibers, Run Nos. 12 and 24 yielded the fibers of extremely low initial modulus due to the excessively high polyamide segment content of block polyesteramide.

The upper limit of the polyamide segment content of modified polyester for exhibiting the adhesibility- and dyeability-improving effect without appreciable detrimental effect on other properties is 30 weight percent. Particularly 10–30 weight percent is the optimum range.

TABLE XII

| Run No. | First component (mixture of BPEC and polycapramide) mixing ratio (wt.: wt.) | Second component (composition of copolymer) | Composite state | Ratio between the first and second components (wt.: wt.) | PEO content of fiber (wt. percent) |
|---|---|---|---|---|---|
| 1 | BPEC($\bar{P}n$=15): PCA, 1:1 [a] | PET | Side-by-side | 1:1 | 12 |
| 2 | BPEC($\bar{P}n$=21): PCA, 1:1 | PET | do | 1:1 | 12 |
| 3 | BPEC($\bar{P}n$=30): PCA, 1:1 | PET | do | 1:1 | 12 |
| 4 | BPEC($\bar{P}n$=64) PCA, 1:1 | PET | do | 1:1 | 12 |
| 5 | BPEC($\bar{P}n$=125): PCA, 1:1 | PET | do | 1:1 | 12 |
| 6 | BPEC($\bar{P}n$=155): PCA, 1:1 | PET | do | 1:1 | 12 |
| 7 | BPEC($\bar{P}n$=170): PCA, 1:1 | PET | do | 1:1 | 12 |
| 8 | BPEC($\bar{P}n$=200): PCA, 1:1 | PET | do | 1:1 | 12 |
| 9 | BPEC($\bar{P}n$=64): PCA, 1:1 | B–I 95/5 | do | 1:1 | 12 |
| 10 | BPEC($\bar{P}n$=64): PCA, 1:1 | B–II 85/15 | do | 1:1 | 12 |
| 11 | BPEC($\bar{P}n$=64): PCA, 1:1 | B–III 75/25 | do | 1:1 | 12 |
| 12 | BPEC($\bar{P}n$=64): PCA, 1:1 | B–IV 65/35 | do | 1:1 | 12 |
| 13 | BPEC($\bar{P}n$=15): PCA, 1:1 | PET | Core-in-sheath [b] | 1:1 | 12 |
| 14 | BPEC($\bar{P}n$=21): PCA, 1:1 | PET | do | 1:1 | 12 |
| 15 | BPEC($\bar{P}n$=30): PCA, 1:1 | PET | do | 1:1 | 12 |
| 16 | BPEC($\bar{P}n$=64): PCA, 1:1 | PET | do | 1:1 | 12 |
| 17 | BPEC($\bar{P}n$=125): PCA, 1:1 | PET | do | 1:1 | 12 |
| 18 | BPEC($\bar{P}n$=155): PCA, 1:1 | PET | do | 1:1 | 12 |
| 19 | BPEC($\bar{P}n$=170): PCA, 1:1 | PET | do | 1:1 | 12 |
| 20 | BPEC($\bar{P}n$=200): PCA, 1:1 | PET | do | 1:1 | 12 |
| 21 | BPEC($\bar{P}n$=64): PCA, 1:1 | B–I 95/5 | do | 1:1 | 12 |
| 22 | BPEC($\bar{P}n$=64): PCA, 1:1 | B–II 85/15 | do | 1:1 | 12 |
| 23 | BPEC($\bar{P}n$=64): PCA, 1:1 | B–III 75/25 | do | 1:1 | 12 |
| 24 | BPEC($\bar{P}n$=64): PCA, 1:1 | B–IV 65/35 | do | 1:1 | 12 |

| Run No. | Spinnability | Drawability | Adhesibility | Frictional static charge (v.) | Dye absorption (percent) | Initial modulus (g./d.) | Remarks |
|---|---|---|---|---|---|---|---|
| 1 | Good | Poor | Good | 291 | 66.3 | 49.5 | Processibility rather poor. |
| 2 | do | Good | do | 285 | 64.2 | 58.8 | |
| 3 | Very good | Very good | Very good | 263 | 63.8 | 65.5 | |
| 4 | do | do | do | 258 | 62.1 | 67.8 | |
| 5 | do | do | do | 258 | 61.3 | 72.1 | |
| 6 | do | do | do | 260 | 59.2 | 69.5 | |
| 7 | Good | Good | Good | 280 | 56.3 | 69.8 | |
| 8 | Poor | Poor | Poor | 285 | 54.2 | 68.5 | Processibility rather poor. |
| 9 | Very good | Very good | Very good | 238 | 65.3 | 57.3 | |
| 10 | do | do | do | 208 | 68.1 | 51.3 | |
| 11 | do | do | do | 188 | 70.8 | 39.6 | |
| 12 | do | do | do | 159 | 74.1 | 29.9 | Initial modulus low. |
| 13 | do | Poor | Good | 245 | 70.1 | 50.1 | Processibility rather poor. |
| 14 | do | Good | do | 240 | 69.5 | 57.9 | |
| 15 | do | Very good | Very good | 225 | 69.4 | 65.5 | |
| 16 | do | do | do | 200 | 68.3 | 66.8 | |
| 17 | do | do | do | 205 | 67.6 | 74.6 | |
| 18 | do | Good | do | 210 | 65.3 | 72.8 | |
| 19 | Good | do | Good | 235 | 65.4 | 73.5 | |
| 20 | Poor | Poor | Poor | 245 | 63.2 | 70.4 | Processibility rather poor. |
| 21 | Very good | Very good | Very good | 185 | 70.8 | 58.3 | |
| 22 | do | do | do | 163 | 75.3 | 53.3 | |
| 23 | do | do | do | 152 | 78.5 | 40.8 | |
| 24 | do | do | do | 120 | 82.6 | 28.1 | Initial modulus low. |

[a] BPEC($\bar{P}n$=15) indicates that the number of EO recurring units in PEO of BPEC is 15 (PCA is polycapramide).
[b] PET was the core and BPEC/PCA was the sheath.

EXAMPLE 5

A polyethylene oxide diamine having amino groups at its both ends was synthesized by cyanoethylating a polyethylene glycol (number average molecular weight: approximately 4,200) and further hydrogenating the same. Then the diamine was reacted with equimolar amount of adipic acid to form a diamine salt. The salt was mixed with ε-caprolactam at such ratios that the polyethylene oxide contents of the mixtures should become the predetermined values, and the mixtures were heated at 240° C. in nitrogen current for a predetermined period. Thus obtained block polyethercapramides were extracted with hot water of 95° C. for 12 hours, to be removed of the unreacted components. The four block polyethercapramides thus obtained are identified in Table XIII.

TABLE XIII

| Number of BPEC: | PEO content of BPEC (ct. percent) | Relative viscosity of BPEC in m-cresol |
|---|---|---|
| I | 8 | 2.59 |
| II | 16 | 2.62 |
| III | 24 | 2.55 |
| IV | 32 | 2.48 |

Using each of the above four block polyetheramides with a polyethylene terephthalate having a relative viscosity in o-chlorophenol of 1.79, side-by-side (Run Nos. 1, 2, 4 and 6) and eccentric core-in-sheath (Run Nos. 3 and 5) composite fibers were formed in the accepted manner. The spinning temperature employed was 290–300° C. at the cylinder portion, and 285–295° C. at the pump portion, with the slight variations depending on the specific block polyetheramide. The winding speed was 425 m./min. The spinnability was good with all runs, and filament bending at the face of the spinnert was hardly observed. The undrawn filaments were drawn 3.5× in the accepted manner, with a hot pin of 70° C. and hot plate of 145° C. The adhesibility of the drawn filaments were good in all runs except Run No. 1 in which the block polyetheramide I was used. The products of all runs except Run No. 1 exhibited no separation of individual components after repetitive exertion of tension of 500 times. The product of Run No. 1 showed partial components' separation after approximately 100 cycles of the stretching. The drawn filaments developed crimps when the tension was freed. Thus, they were spontaneous or self-crimping filaments. The properties of the drawn filaments are shown in Table XIV.

In the table, Run Nos. 7 and 8 are the controls. In the former a polyethylene terephthalate isophthalate copolyester (terephthalate:isophthalate=90:10) having a relative viscosity in o-chlorophenol of 1.74 was used in place of the block polyetheramide. The product of Run No. 8 is an unmodified polyethylene terephthalate filament.

TABLE XIV

| | Components of composite filaments | | | PEO content of filament (wt. percent) | Frictional static charge (v.) | Equilibrium water content (wt. percent) | Dye absorption (percent) | Crimp properties | | |
|---|---|---|---|---|---|---|---|---|---|---|
| | First component (BPEC) | Second component | Ratio between the first and second components (wt.:wt.) | | | | | Number of crimps (peak/ 25 mm.) | Crimp eliminating load (g./d.) | Remarks |
| Run No.: | | | | | | | | | | |
| 1 | Block poly-ether-capramide. | PET a | 50:50 | 4.0 | 1,350 | 3.91 | 59.5 | 33.9 | 0.100 | Side-by-side adhesibility rather poor. |
| 2 | I<br>II | PET | 50:50 | 8.0 | 1,030 | 4.60 | 61.8 | 54.8 | 0.098 | Side-by-side adhesibility passable. |
| 3 | II | PET | 33:67 | 5.3 | 950 | 3.13 | 39.5 | 13.5 | 0.114 | Core-in-sheath b |
| 4 | III | PET | 50:50 | 12.0 | 880 | 5.45 | 66.3 | 60.3 | 0.095 | Side-by-side adhesibility good. |
| 5 | III | PET | 33:67 | 7.9 | 1,530 | 3.70 | 41.5 | 15.8 | 0.109 | Core-in-sheath c. |
| 6 | IV | PET | 50:50 | 16.0 | 630 | 6.28 | 68.5 | 75.9 | 0.084 | Side-by-side adhesibility good. |
| 7 | Copolyester d | PET | 50:50 | 0 | 3,740 | 0.67 | 24.3 | 21.8 | 0.085 | Side-by-side adhesibility good, control. |
| 8 | PET | | | 0 | 3,980 | 0.48 | 21.0 | | | Control. | a Polyethylene terephthalate.
b PET was the core.
c Block polyethercapramide was the core.
d Polyethylene terephthalate/polyethylene isophthalate, 90/10.

The results given in Table XIV indicate that the filaments of this invention possess better antistatic property, dyeability and hygroscopicity, than the two control products (Run Nos. 7 and 8). Inter alia, the core-in-sheath structure composite filament in which the block polyethercapramide was the sheath (Run No. 3) showed extremely good antistatic property. Also the filaments of the invention had an improved hand, unlike the stiff hand of polyethylene terephthalate fiber.

EXAMPLE 6

In the similar manner to Example 5, four block polyethercapramides identified in Table XV were synthesized.

TABLE XV

| | Number average molecular weight of starting polyethylene glycol | Polyethylene oxide segment content of BPEC (wt. percent) | Relative viscosity of BPEC in m-cresol |
|---|---|---|---|
| Number of BPEC: | | | |
| I | ¹ 8,300 | 24 | 2.63 |
| II | ¹ 6,100 | 24 | 2.65 |
| III | ¹ 2,200 | 24 | 2.68 |
| IV | ¹ 1,100 | 24 | 2.59 |

¹ Approximately.

Using each of the above block polyethercapramide and a polyethylene terephthalate having a relative viscosity in o-chlorophenol of 1.75, side-by-side type composite filaments were prepared in the manner described in Example 5. All of thus obtained drawn composite filaments developed coil-formed crimps when freed from tension. The fiber quality of the products are shown in the following Table XVI, together with the results of two control runs (Run Nos. 5 and 6).

TABLE XVI

| | Components of composite fiber | | | PEO content of fiber (wt. percent) | Frictional static charge (v.) |
|---|---|---|---|---|---|
| | First component | Second component | Ratio between the first and second components (wt.:wt.) | | |
| Run No.: | | | | | |
| 1 | I | PET [a] | Side-by-side 50:50 | 12 | 880 |
| 2 | II | PET [a] | do | 12 | 870 |
| 3 | III | PET [a] | do | 12 | 1,010 |
| 4 | IV | PET [a] | do | 12 | 1,090 |
| 5 | Polyester copolymer [b] | PET [a] | do | 0 | 3,760 |
| 6 | | PET [a] | | 0 | 3,940 |

| | Crimp characteristics | | | | | Tensile properties | | |
|---|---|---|---|---|---|---|---|---|
| | Dye absorption (percent) | Number of crimps (peak/ 25 mm.) | Crimp ratio (percent) | Crimp elasticity (percent) | Crimp eliminating load (g./d.) | Strength (g./d.) | Elongation (percent) | Initial modulus (g./d.) |
| Run No.: | | | | | | | | |
| 1 | 52.1 | 51.2 | 52.3 | 69.8 | 0.081 | 2.69 | 29.5 | 55.5 |
| 2 | 64.8 | 60.3 | 53.5 | 78.1 | 0.094 | 3.85 | 31.8 | 56.9 |
| 3 | 66.1 | 67.5 | 57.0 | 75.3 | 0.085 | 3.78 | 30.9 | 58.1 |
| 4 | 67.5 | 78.1 | 54.8 | 71.5 | 0.079 | 3.05 | 28.8 | 49.8 |
| 5 | 25.1 | 26.3 | 21.4 | 78.9 | 0.081 | 3.28 | 29.4 | 88.9 |
| 6 | 21.0 | | | | | 4.35 | 29.5 | 109.0 |

[a] Polyethylene terephthalate.
[b] A copolymer of polyethylene terephthalate/polyethylene isophthalate, 88/12.

So far as our experiments confirmed, the adhesibility of the two components was excellent with the block polyetheramides III and IV having short polyether segments. However, from overall characteristics of the filaments, use of block polyetheramides containing the polyetheramide segments of the molecular weight ranging 2,000–6,000 gave the optimum results.

EXAMPLE 7

A polypropylene oxide diamine having amino groups at its both ends was synthesized by cyanoethylating a polypropylene glycol (number average molecular weight: approximately 5,200) and further hydrogenating the same. The product was reacted with equimolar amount of sebasic acid to form a diamine salt. The salt was mixed with ε-caprolactam at such ratios that the mixtures' propylene oxide content should become the predetermined values, and the mixtures were heated at 240° C. in nitrogen current for a predetermined period. Thus three types of block polyetheramides were obtained.

The products were extracted with hot water of 95° C. for 12 hours to be removed of the unreacted components. The properties of the block polyetheramides are shown in Table XVII below.

TABLE XVII

| | Polypropylene oxide segment content of BPEC (wt. percent) | Relative viscosity of BPEC in m-cresol |
|---|---|---|
| Number of BPEC: | | |
| I | 16.0 | 2.69 |
| II | 24.0 | 2.52 |
| III | 32.0 | 2.39 |

Separately, a minor amount of a polymerization catalyst was added to p-(β-oxyethoxy)methyl benzoate, and the mixture was first subjected to a prepolymerization by heating at 180–220° C. for 3 hours at atmospheric pressure. Then the temperature was raised to 250° C., and polymerization was continuously performed under a reduced pressure of 0.2 mm. Hg for 10 hours. Thus obtained polymer was extruded into a form of gut, and then cut into chips. The relative viscosity of the polymer in o-chlorophenol was 1.89.

Using each of the above block polyetheramides and the poly-p-ethylene oxybenzoate, side-by-side type composite drawn filaments were prepared in the manner described in Example 5. The adhesion between the two components was good, and none of the products showed any separation after 500 times' repetitive exertion of tension. The properties of the drawn filaments are shown in Table XVIII. Also for comparison, the properties of a composite filament prepared from two poly-p-ethylene oxybenzoates of different viscosities (relative viscosities in o-chlorophenol: 1.89 and 1.71) are shown in the same table.

TABLE XVIII

| | Components of composite filament | | | Polyether content of filament (wt. percent) | Frictional static charge (v.) |
|---|---|---|---|---|---|
| | First component | Second component | Ratio between the first and second components (wt.:wt.) | | |
| Run No.: | | | | | |
| 1 | BPEC I | Poly-p-ethylene oxybenzoate. | Side-by-side, 50:50 | 8.0 | 1,230 |
| 2 | BPEC II | do | do | 12.0 | 1,030 |
| 3 | BPEC III | do | do | 16.0 | 960 |
| 4 | Poly-p-ethylene oxybenzoate. | do | do | 0 | 3,850 |

| | Crimp characteristics | | | | | Tensile properties | | |
|---|---|---|---|---|---|---|---|---|
| | Dye absorption (percent) | Number of crimps (peak/25 mm.) | Crimp ratio (percent) | Crimp elasticity (percent) | Crimp eliminating load (g./d.) | Strength (g./d.) | Elongation (percent) | Initial modulus (g./d.) |
| Run No.: | | | | | | | | |
| 1 | 59.3 | 39.1 | 40.5 | 77.5 | 0.083 | 3.26 | 29.9 | 45.5 |
| 2 | 61.5 | 48.3 | 51.8 | 76.1 | 0.087 | 2.98 | 31.5 | 41.8 |
| 3 | 63.5 | 56.1 | 58.3 | 73.8 | 0.081 | 2.85 | 30.8 | 37.9 |
| 4 | 22.1 | 18.5 | 20.7 | 88.1 | 0.121 | 3.65 | 33.2 | 82.3 |

EXAMPLE 8

A block polyethercapramide of which polyethylene oxide segment content was 45 weight percent was synthesized from a polyethylene glycol (number average molecular weight: approximately 4,400) in the manner described in Example 5. The relative viscosity of the polymer in m-cresol was 2.49. Mixtures of this block polyethercapramide and a polycapramide having a relative viscosity in 98% sulfuric acid of 2.65 were used as the first components in the experiments, and a polyethylene terephthalate having a relative viscosity in o-chlorophenol of 1.78 was used as the second component, to form side-by-side and core-in-sheath structure composite filaments. The spinning and drawing operations were similar to those described in Example 5. The products exhibited excellent antistatic property. The properties of the products are shown in Table XIX.

content was 45 weight percent was synthesized from a polyethylene glycol (number average molecular weight: approximately 4,100) in the similar manner described in Example 5. The polymer had a relative viscosity of 2.51 in m-cresol.

A chip mixture of the block polyethercapramide and a

TABLE XIX

| | Filament component | | PEO content of filament (wt. percent) | Frictional static charge (v.) | Crimp characteristics | | |
|---|---|---|---|---|---|---|---|
| | First component (by weight) | Ratio between first and second component (wt.:wt.) | | | Number of crimps (peak/ 25 mm.) | Crimp elasticity (percent) | Crimp eliminating load (g./d.) |
| Run No.: | | | | | | | |
| 1 | BPEC:PCA, 20:80 | Eccentric core-in-sheath a, 50:50 | 4.5 | 500 | 15.1 | 79.8 | 0.091 |
| 2 | BPEC:PCA, 20:80 | Concentric core-in-sheath b, 50:50 | 4.5 | 920 | 0 | | |
| 3 | BPEC:PCA, 10:90 | Eccentric core-in-sheath b, 35:65 | 1.6 | 1,520 | 9.7 | 83.1 | 0.098 |
| 4 | BPEC:PCA, 50:50 | Side-by-side, 50:50 | 11.5 | 260 | 36.8 | 76.8 | 0.191 |
| 5 | BPEC:PCA, 60:40 | Side-by-side, 50:50 | 13.5 | 200 | 38.5 | 74.0 | 0.089 | a PET was the core.
b Mixture of BPEC and PCA (polycapramide) were the cores.

From the results of Table XIX, it can be understood that the composite filaments obtained from a mixture of block polyethercapramide and polyamide as the first component and polyethylene terephthalate as the first component and polyethylene terephthalate as the second component possess excellent antistatic property. The presence of only 1.6 weight percent of polyethylene oxide segment in the filaments remarkably reduces the accumulation of frictional static charge.

EXAMPLE 9

A block polyethercapramide of which polyethylene oxide polyamide having a relative viscosity of 2.68 in 98% sulfuric acid was used as the first component, which was spun into composite filaments together with the poly-p-ethylene oxybenzoate prepared in the manner similar to Example 7. Thus in the manner similar to Example 5, eccentric and concentric core-in-sheath structure composite drawn filaments were prepared. The products exhibited excellent antistatic property. The properties of the products obtained are shown in Table XX, together with the properties of the filaments from poly-p-ethylene oxybenzoate alone as control.

TABLE XX

| | Filament component | | | PEO content of filament (wt. percent) |
|---|---|---|---|---|
| | First component (sheath) (mixture of BPEC and PCA) | Second component (core) | Ratio between the first and second component (wt.:wt.) | |
| Run No.: | | | | |
| 1 | BPEC:PCA, 20:80 | Poly-p-ethylene-oxybenzoate. | Eccentric core-in-sheath, 50:50. | 4.5 |
| 2 | BPEC:PCA, 20:80 | do | Eccentric core-in-sheath, 35:65. | 3.2 |
| 3 | BPEC:PCA, 10:90 | do | do | 1.5 |
| 4 | BPEC:PCA, 20:80 | do | Concentric core-in-sheath, 50:50. | 4.5 |
| 5 | BPEC:PCA, 20:80 | do | Concentric core-in-sheath, 20:80. | 1.8 |
| 6 | | Poly-p-ethylene oxybenzoate alone. | | |

| | Crimp characteristics | | | | Tensile properties | | |
|---|---|---|---|---|---|---|---|
| | Frictional static charge (v.) | Number of crimps (peak/ 25 mm.) | Crimp elasticity (percent) | Crimp eliminating (g./d.) | Strength (g./d.) | Elongation (percent) | Initial modulus (g./d.) |
| Run No.: | | | | | | | |
| 1 | 510 | 13.5 | 77.4 | 0.088 | 4.56 | 30.8 | 47.5 |
| 2 | 640 | 16.5 | 79.8 | 0.092 | 4.85 | 29.5 | 57.3 |
| 3 | 785 | 8.9 | 81.3 | 0.098 | 5.01 | 31.6 | 59.8 |
| 4 | 505 | 0 | | | 4.48 | 34.5 | 49.5 |
| 5 | 790 | 0 | | | 5.03 | 32.1 | 67.0 |
| 6 | 3,870 | | | | 4.75 | 32.9 | 81.3 |

The results given in Table XX clearly indicate that the antistatic property of the composite filaments of this invention is excellent. Also the products of the invention had the strength of substantially equal level to the control (Run No. 6), thus retaining the advantageous characteristics of poly-p-ethylene oxybenzoate. Also their somewhat lowered initial modulus contributes to their improved, supple hand.

EXAMPLE 10

A salt consisting of equimolar amounts of polyethylene oxide diamine and adipic acid prepared in the manner similar to Example 5 was mixed with hexamethylene diammonium adipate, and the mixture was polymerized in m-cresol at 180° C. for 6 hours.

Thereafter a large excess of methanol was added to the reaction liquid to precipitate the polymer. The precipitate was filtered, washed with water and dried. Thus obtained block polyetheramides are identified in Table XXI.

Separately, poly hexamethylene adipamide having a relative viscosity of 2.45 in 98% sulfuric acid as synthesized in the accepted manner. Likewise, polyethylene terephthalate having a relative viscosity of 1.81 in o-chlorophenol was prepared in accordance with the accepted practice.

TABLE XXI

| | Number average molecular weight of starting polyethylene glycol | PEO content BPEA (wt. percent) | Relative viscosity of BPEA in m-cresol |
|---|---|---|---|
| Number of BPEA: | | | |
| I | ¹4,200 | 45 | 2.51 |
| II | ¹2,200 | 45 | 2.53 |
| III | ¹2,200 | 32 | 2.48 |

¹ Approximately.

Two cores-in-sheath type composite filaments were prepared, using the polyethylene terephthalate and the block polyetheramide III as the cores, and mixtures of the block polyetheramides I or II and the hexamethylene adipamide as the sheath. The spinning was performed as follows.

In a conventional two-component composite spinning apparatus equipped with an additional melter, the three components were melted separately. The three molten polymers were separately led to the spinneret portion through conduits, and spun through a composite spinneret. The undrawn filaments were drawn by 2.8 times with a hot pin of 70° C. Thus drawn filaments developed somewhat irregular, three-dimensional crimps when freed from tension. The filaments were cut by approximately 60 mm. lengths, and opened with hand card to be formed into fiber mass. The mass had crimp characteristics and feeling (softness and liveliness felt when the mass was crumbled with hand) quite close to those of wool. Whereas, the antistatic property of the products was far better than that of wool. These results are given in the following Table XXII.

EXAMPLE 11

A block polyetheramide was synthesized from a polyethylene glycol (number average molecular weight: approximately 4,300) and ε-caprolactam in the manner similar to Example 5.

Separately, modified polyesters were prepared as follows: Chips of polycapramide having amino groups at the both ends were mixed with polyethylene terephthalate chips, and the mixture was melt-mixed in an extruder.

TABLE XXII

| Components of composite filament | | | | Ratio among cores and sheath | | | PEO content of filament (wt. percent) | Frictional static charge (v.) | Compression characteristics | | | Crimp characteristics | | | Tensile properties | | |
|---|---|---|---|---|---|---|---|---|---|---|---|---|---|---|---|---|---|
| Core 1 | Core 2 | Sheath | | Core 1 | Core 2 | Sheath | | | Compressive energy (cm.·g./cm.³) | Recovery energy (cm.·g./cm.³) | Resilience (cm.·g./cm.³) | Crimp of number (peak/25 mm.) | Crimp elasticity (percent) | | Strength (g./d.) | Elongation (percent) | Initial modulus (g./d.) |
| BPEA III | PETª | Mixture of BPEA I and polyhexamethylene adipamide, 20:80 (by weight) | | 3 | 3 | 4 | 13.2 | 220 | 42.4 | 17.6 | 41.5 | 8.9 | 82.5 | | 2.95 | 31.1 | 46.5 |
| BPEA III | PET | Mixture of BPEA II and polyhexamethylene adipamide, 20:80 (by weight) | | 3 | 3 | 4 | 13.2 | 260 | 40.3 | 17.4 | 43.2 | 9.5 | 79.8 | | 3.10 | 32.3 | 44.3 |
| | | Wool | | | | | 0 | ᵇ1,980 | 39.4 | 19.6 | 49.8 | 10.5 | 77.5 | | 1.58 | 33.5 | 25.3 |
| | | PET | | | | | 0 | 3,940 | 62.5 | 19.8 | 31.7 | | | | 4.98 | 35.3 | 103 |

ᵃ Polyethylene terephthalate.
ᵇ The wool was rubbed with a piece of nylon textile.

The mixture was dried, and subjected to a solid phase polymerization at 200° C., under a reduced pressure of 0.5 mm. Hg for 10–16 hours. Thus modified polyesters in which the polyester component and polyamide component were combined in block forms (hereinafter the modified polyesters will be referred to as block polyesteramides) were obtained. The particulars of the block polyesteramides are shown in Table XXIII.

TABLE XXIII

| No. of block polyesteramide | Number average molecular weight of starting polyester component | Number average molecular weight of starting polyamide component | Composition copolymer polyester/polyamide | Relative viscosity of block polyesteramide in o-chlorophenol |
|---|---|---|---|---|
| I | 5,200 | 1,300 | 80/20 | 1.95 |
| II | 11,000 | 2,500 | 80/20 | 1.98 |
| III | 14,500 | 3,750 | 80/20 | 1.93 |
| IV | 11,000 | 4,300 | 70/30 | 2.06 |
| V | 15,000 | 7,500 | 70/30 | 2.11 |

Various composite drawn filaments were prepared from the above five block polyesteramides, and block polyetheramides, or mixtures of block polyetheramide with polycapramide, as indicated in Table XXIV. Block polyesteramide exhibited better adhesibility to block polyetheramide than unmodified polyester, for example, polyethylene terephthalate. Therefore, in the case of core-in-sheath structure, thinner sheath may be employed. As to side-by-side structure, while in Example 5 the block polyethercapramide (PEO segment content: 8 weight percent) and polyethylene terephthalate showed partial separation or peeling off during the stretching, the replacement of polyethylene terephthalate by the block polyesteramide as done in this example eliminated such fated defect.

We claim:

1. Composite fibers in which at least two polymeric components are arranged in intimate mutual contact along the fiber length, and at least one of the said components is a fiber-forming polyester, and the other of the said components is a polyether-polyamide-block-copolymer composed of linear polyamide segments and polyalkylene ether segments, the polyalkylene ether segment content of the copolymer being 3 to 85% by weight, and the polyalkylene ether segment content of the composite fibers being 0.3 to 30% by weight.

2. The composite fibers of claim 1, in which the polyalkylene ether segment content of the polyether-polyamide-block-copolymer is 8 to 60% by weight, the polyalkylene ether segment content of the fibers is 0.8 to 30% by weight, and the average recurring unit number of the alkylene oxide forming the polyalkylene ether segment is 20 to 180.

3. The composite filament of claim 2 in which the average recurring unit number of the alkylene oxide forming the polyalkylene ether segment is 25 to 140.

4. The composite filament of claim 1 in which the polyester component is a block-polymer consisting of polyester segments and linear polyamide segments, the polyamide segment content of the block-copolymer being 0–30% by weight.

5. Composite fibers in which as least two polymeric components are arranged in intimate mutual contact and in side-by-side relationship along the fiber length, and at least one of the said components is a fiber-forming polyester, and the other of the said components is a polyether-polyamide-block-copolymer consisting of linear polyamide segments and polyalkylene ether segments, the polyalkylene ether segment content of the block-copolymer being 8 to 85% by weight, and the polyalkylene ether segment content of the fibers being 0.8 to 30% by weight.

6. The composite fibers of claim 5 in which the polyalkylene ether segment content of the polyether-polyamide-block-copolymer is 10 to 60% by weight, the polyalkylene ether segment content of the composite fibers

TABLE XXIV

| | Components of composite filament | | | PEO content of filament (wt. percent) |
|---|---|---|---|---|
| | First component BPEC [a] | Second component (block polyesteramide) | Ratio between the first and second components (wt.:wt.) | |
| Run No.: | | | | |
| 1 | BPEC I | III | Side-by-side, 50:50 | 12.0 |
| 2 | BPEC I | V | do | 12.0 |
| 3 | BPEC II | I | Core-in-sheath [b] (concentric), 15:85. | 3.6 |
| 4 | BPEC II | II | Core-in-sheath,[c] 15:85. | 3.6 |
| 5 | Mixture of BPEC III and PCA, 66:34 (by weight). | IV | Side-by-side (concentric), 50:50. | 15.0 |
| 6 | Mixture of BPEC III and PCA, 34:66 (by weight). | IV | Core-in-sheath [b] (concentric), 20:80. | 3.0 |
| 7 | Mixture of BPEC III and PCA, 20:80 (by weight). | I | Core-in-sheath [b] (concentric), 40:60. | 3.6 |

| | Equilibrium water content (wt. percent) | Crimp characteristics | | Tensile properties | | |
|---|---|---|---|---|---|---|
| | Frictional static charge (v.) | | Number of crimps (peak/25 mm.) | Crimp eliminating load (g./d.) | Strength (g./d.) | Elongation (percent) | Initial modulus (g./d.) |
| Run No.: | | | | | | | |
| 1 | 720 | 5.72 | 58.6 | 0.091 | 3.22 | 25.6 | 52.1 |
| 2 | 630 | 5.85 | 52.6 | 0.083 | 3.11 | 25.3 | 56.3 |
| 3 | 820 | 2.63 | 0 | | 3.83 | 27.2 | 82.4 |
| 4 | 1,350 | 2.54 | 0 | | 3.75 | 24.5 | 80.3 |
| 5 | 165 | 6.21 | 38.5 | 0.083 | 3.32 | 29.3 | 57.2 |
| 6 | 720 | 2.68 | 12.9 | 0.092 | 3.95 | 27.5 | 79.5 |
| 7 | 590 | 3.39 | 14.8 | 0.095 | 3.50 | 28.3 | 65.9 |

[a] Block polyethercapramides (BPEC):

| Number of BPEC: | PEO content of BPEC (wt. percent) | Relative viscosity of BPEC in m-cresol |
|---|---|---|
| I | 24 | 2.58 |
| II | 24 | 2.43 |
| III | 45 | 2.40 |

[b] Block polyesteramide was core, and BPEC or the mixture of BPEC and PCA.
[c] BPEC was core and block polyesteramide was the sheath.
[d] Polycapramide (PCA). Relative viscosity in 98% sulfuric acid, 2.63.

is 1.0 to 30% by weight, and the average recurring unit number of the alkylene oxide composing the polyalkylene ether segments is 20 to 180.

7. The composite filament of claim 6 in which the average recurring unit number of the alkylene oxide composing the polyalkylene ether segments is 25 to 140.

8. The composite fibers of claim 5 in which the polyester component is a block-copolymer consisting of polyester segments and linear polyamide segments, the polyamide segment content of the same block-copolymer being 0 to 30% by weight.

9. Composite fibers in which at least two polymeric components are arranged in cores-in-sheath relationship along the fiber length, and one of the said components is a fiber-forming polyester, and the other of the said components is a polyether-polyamide-block-copolymer consisting of linear polyamide segments and polyalkylene ether segments, the polyalkylene ether segment content of the block-copolymer being 3 to 85% by weight, and the polyalkylene ether segment content of the composite fibers being 0.3 to 30% by weight.

10. The composite fibers of claim 9 in which the polyalkylene ether segment content of the polyether-polyamide-block-copolymer is 8 to 60% by weight, the polyalkylene ether segment content of the composite fibers is 0.8 to 30% by weight, and the average recurring unit number of the alkylene oxide forming the polyalkylene ether segments is 20 to 180.

11. The composite filament of claim 10 in which the average recurring unit number of the alkylene oxide forming the polyalkylene ether segments is 25 to 140.

12. The composite fibers of claim 9 in which the polyester component is a block-copolymer consisting of polyester segments and linear polyamide segments, the polyamide segment content of the block-copolymer being 0 to 30% by weight.

13. Composite fibers in which at least two polymeric components are arranged in intimate mutual contact along the fiber length and one of the said components is a fiber-forming polyester, and the other of the said components is a mixture of a polyether-polyamide-block-copolymer consisting of linear polyamide segments and polyalkylene ether segments, with polyamide, the polyalkylene ether segment content of the mixture being 3 to 85% by weight, and the polyalkylene ether segment content of the composite fibers being 0.3 to 30% by weight.

14. The composite fibers of claim 13 in which the polyalkylene ether segment content of the mixture of the polyether-polyamide-block-copolymer with polyamide is 8 to 60% by weight, the polyalkylene ether segment content of the composite fibers is 0.8 to 30% by weight, and the average recurring unit number of the alkylene oxide forming the polyalkylene ether segments is 20 to 180.

15. The composite filament of claim 14 in which the average recurring unit number of the alkylene oxide forming the polyalkylene ether segments is 25 to 140.

16. The composite filament of claim 13 in which the polyester component is a block-copolymer consisting of polyester segments and linear polyamide segments, the polyamide segment content of the block-copolymer being 0 to 30% by weight.

17. Composite fibers in which at least two polymeric components are arranged in intimate mutual contact and side-by-side relationship along the fiber length, and one of the component is a fiber-forming polyester, and the other of the said components is a mixture of a polyether polyamide-block-copolymer consisting of linear polyamide segments and polyalkylene ether segments, with polyamide, the polyalkylene ether segment content of the mixture being 8 to 85% by weight, and the polyalkylene ether segment content of the composite fibers being 0.8 to 30% by weight.

18. The composite fibers of claim 17 in which the polyalkylene ether segment content of the mixture of polyether-polyamide-block-copolymer and polyamide is 10 to 60% by weight, the polyalkylene ether segment content of the composite fibers is 1.0 to 30% by weight, and the average recurring unit number of the alkylene oxide forming the polyalkylene ether segments is 20 to 180.

19. The composite fibers of claim 18, in which the average recurring unit number of the alkylene oxide forming the polyalkylene ether segments is 25 to 140.

20. The composite fibers of claim 17, in which the polyester component is a block-copolymer consisting of polyester segments and linear polyamide segments, the polyamide segment content of the block-copolymer being 0 to 30% by weight.

21. Composite fibers in which at least two polymeric components are arranged in one cores-in-sheath relationship along the fiber length, and one of the said component is a fiber-forming polyester, and the other of the said components is a mixture of a polyether-polyamide-block-copolymer consisting of linear polyamide segments and polyalkylene ether segments, with polyamide, the polyalkylene ether segment content of the mixture being 3 to 85% by weight, and the polyalkylene ether segment content of the composite fibers being 0.3 to 30% by weight.

22. The composite fibers of claim 21 in which the polyalkylene ether segment content of the mixture of the polyether-polyamide-block-copolymer with polyamide is 8 to 60% by weight, the polyalkylene ether segment content of the composite fibers is 0.8 to 30% by weight, and the average recurring unit number of the alkylene oxide forming the polyalkylene ether segments is 20 to 180.

23. The composite fibers of claim 22 in which the average recurring unit number of the alkylene oxide forming the polyalkylene ether segments is 25 to 140.

24. The composite fibers of claim 21 in which the polyester component is a block-copolymer consisting of polyester segments and linear polyamide segments, the polyamide segment content of the block-copolymer being 0 to 30% by weight.

References Cited

UNITED STATES PATENTS

| | | | |
|---|---|---|---|
| 3,384,681 | 5/1968 | Kobayashi et al. | 260—857 |
| 3,397,107 | 8/1968 | Kimura | 264—171 |
| 3,489,641 | 1/1970 | Harcolinski et al. | 161—173 |
| 3,493,544 | 2/1970 | Goodman et al. | 260—857 |

ROBERT F. BURNETT, Primary Examiner

L. M. CARLIN, Assistant Examiner

U.S. Cl. X.R.

161—175, 177; 264—171